C. L. Pierce,
Sawing Shingles,
N° 47,449. Patented Apr. 25, 1865.
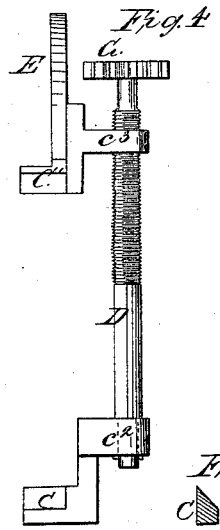
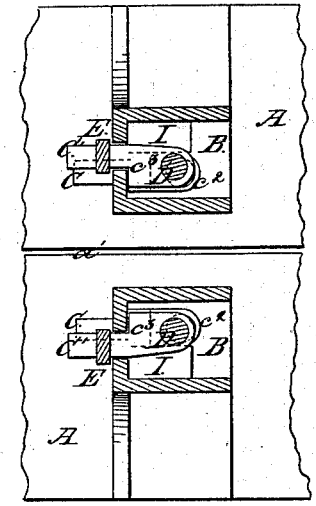
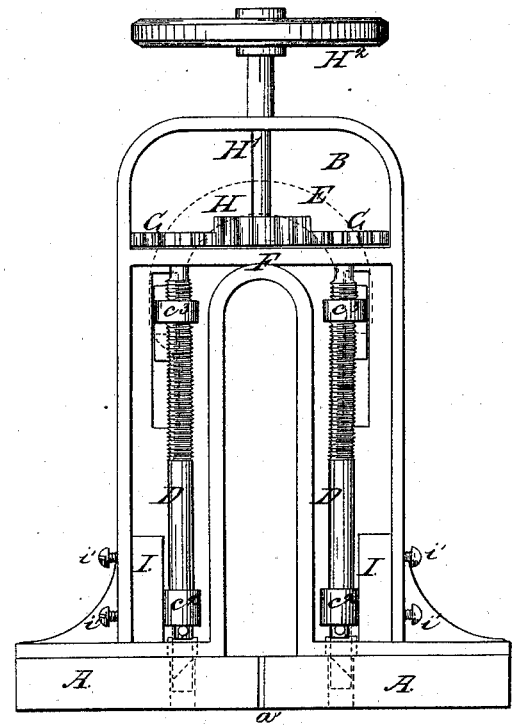
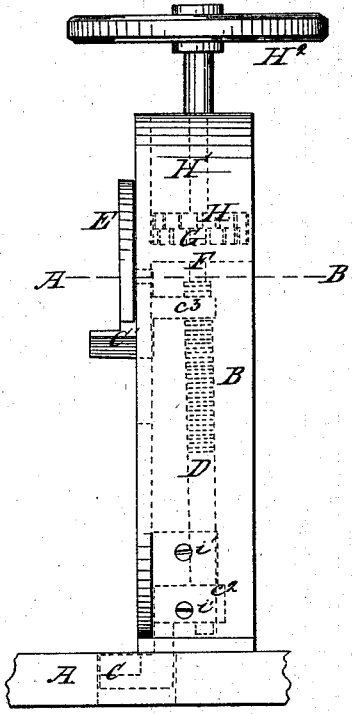
Witnesses
W. C. Forbush
Geo. W. Wallace
Inventor
Chas. L. Pierce

UNITED STATES PATENT OFFICE.

CHARLES L. PIERCE, OF BUFFALO, NEW YORK.

IMPROVEMENT IN SHINGLE-SAWING MACHINES.

Specification forming part of Letters Patent No. 47,449, dated April 25, 1865.

*To all whom it may concern:*

Be it known that I, CHARLES L. PIERCE, of the city of Buffalo, county of Erie, and State of New York, have invented a certain new and useful Improvement in Dogs for Holding Shingle-Blocks; and I do hereby declare that the following is a full, clear, and exact description of the construction and operation of the same, reference being had to the accompanying drawings, making a part of this specification, in which—

Figure I is a front elevation of my improvement. Fig. II is a side elevation of same. Fig. III is a cross-section on line A B. Fig. IV is an elevation of one pair of dogs and operating-screw. Fig. V is a cross-section of one of the dogs, showing their beveled or knife edge.

The nature of this invention consists in the combination of two pair of "dogs" with the reciprocating table, by which the "block" or "bolt" is carried to and from the saw, said dogs being so arranged as to clamp the block above and below in such a manner that as the block is cut by the saw, one pair of dogs will hold the block upon one side of the saw kerf or cut and the other pair will hold the block upon the other side of the saw-kerf, whereby the block as it is cut by the saw is prevented from springing together and pinching the saw.

Letters of like name and kind refer to like parts in each of the figures.

This invention is designed for use in connection with the machine for sawing shingle-bolts, for which Letters Patent No. 42,505, dated April 26, 1864, were granted to me, and is described in the said patent and represented in the model and drawings thereof, but is not claimed; but it is obviously adapted to other machines for like or similar purposes.

A represents the reciprocating table, or a portion of it, upon which the block to be sawed into bolts is placed. This table is constructed (as described in the above-mentioned patent) of two planks, one on each side of the saw, leaving a longitudinal slit or opening, $a'$, up through which the saw projects. The two planks are connected together by arched standards, which straddle the saw as they pass over it in the reciprocating motion of the table.

B represents the front standard, which carries the clamping-dogs.

C C' represent the dogs by which the block is held, C representing the lower and C' the upper dogs.

D D represent the clamping-screws by which the dogs are drawn together to take hold of the blocks. They are each placed vertically within either leg of the standard B and on either side of the saw, said standard being constructed with lateral ribs in a manner to form recesses for the proper reception of said screws. (See specially Fig. III.)

The lower dogs are formed with right-angled shanks $c^2$, bored to receive the lower ends of the clamping-screws, which have journals turned on them, allowing them to turn freely in the shank, the dogs being held longitudinally by a shoulder on the screw above and by a pin or nut below.

The upper dogs, C', have also shanks $c^3$ bored out and screw-threads cut therein, through which the clamping-screws pass, which, according to the direction in which they are turned, draw together or move apart the dogs.

The dogs project through beyond the front vertical surface of the standard, as seen in Figs. II and III, and are beveled to a sharp or knife edge from the outside, leaving the inner faces vertical, as clearly shown in Fig. V. This beveling has the effect as the dogs bite into the block to cause them to draw from each other, so that as the block is cut by the saw they not only prevent the block from springing together and pinching the saw, but have a tendency to spread it apart in a manner to allow the saw to work freely and with little friction.

The front plate of the standard has vertical slots cut in it, through which the dogs project, which slots also act as guides and give lateral support to the dogs in their movement by the clamping-screws.

The table A is also recessed to receive the lower dogs, into which recesses they enter to bring them below the plane of the table. These recesses also serve as guides and lateral supports to the lower dogs. The upper dogs are also connected together by an arched brace, E, which gives them additional strength and support.

The clamping screws have journal-bearings near their upper ends in the transverse rib F of the standard B, and have pinions G keyed upon their upper ends, by which they are turned.

H represents a spur-wheel placed between and meshing with the pinions G. It is keyed upon the shaft H', which projects up above the standard B and carries a hand-wheel, H², by which motion is given at and through the pinions to the screws.

I represents blocks, made adjustable by set-screws i', which bear against the shanks of the lower dogs and secure them against any twisting strain as they are drawn into the block by the clamping-screws.

The block being placed upon the table, the turning of the hand-wheel H² in the proper direction will operate the clamping-screws and cause the upper dogs to move down until they strike the blocks, when the lower dogs will move upward until they also strike the block, after which the further operation of the clamping-screws will cause them all to bite into the block equally and in a manner to hold the block firmly in place to be presented to the action of the saw. As the saw cuts into the block the dogs, as before stated, will prevent (there being one on each side of the saw at top and bottom of the block) the block from springing together and allow the saw to revolve freely and without friction or binding. After the block is divided, the reverse motion of the hand-wheel releases the hold of the dogs upon the block and it is free to be removed.

Having thus described my invention, what I claim as new, and desire to secure by Letters Patent, is—

The combination of two pairs of dogs, C C', with the reciprocating table A, said dogs being so arranged as to clamp the block above and below upon each side of the saw-kerf in a manner to prevent the block from pinching or binding the saw, when constructed and operating substantially as set forth.

CHAS. L. PIERCE.

Witnesses:
W. H. FORBUSH,
GEO. W. WALLACE.